United States Patent
Hama

(10) Patent No.: US 9,578,138 B2
(45) Date of Patent: Feb. 21, 2017

(54) SIP SESSION MANAGEMENT FOR FAX COMMUNICATION

(75) Inventor: Mikio Hama, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/529,546

(22) Filed: Jun. 21, 2012

(65) Prior Publication Data

US 2012/0327466 A1    Dec. 27, 2012

(30) Foreign Application Priority Data

Jun. 24, 2011  (JP) .................. 2011-140673

(51) Int. Cl.
| | |
|---|---|
| G06F 3/12 | (2006.01) |
| H04N 1/00 | (2006.01) |
| H04L 29/06 | (2006.01) |
| H04N 1/327 | (2006.01) |

(52) U.S. Cl.
CPC .......... *H04L 69/08* (2013.01); *H04L 65/1006* (2013.01); *H04L 65/1069* (2013.01); *H04N 1/0022* (2013.01); *H04N 1/32765* (2013.01); *H04N 1/32789* (2013.01); *H04N 2201/0024* (2013.01); *H04N 2201/0093* (2013.01)

(58) Field of Classification Search
CPC .......... H04N 1/0022; H04N 1/00214; H04N 1/00209; H04N 1/32765; H04N 1/32789; H04N 2201/0024; H04N 2201/0093; H04N 2201/0094; H04N 65/1006; H04N 65/1069; H04N 69/08

USPC ............. 358/1.1, 1.13, 1.15, 1.18, 400, 402, 358/405, 407, 442; 370/231, 235, 370/465–468
See application file for complete search history.

(56) References Cited

U.S. PATENT DOCUMENTS

| | | | |
|---|---|---|---|
| 8,284,457 B2* | 10/2012 | Koue et al. ................... | 358/402 |
| 8,369,319 B2* | 2/2013 | Buckley et al. ............... | 370/354 |
| 2006/0136596 A1* | 6/2006 | Izumi ............................ | 709/230 |
| 2009/0080029 A1* | 3/2009 | Vendrow et al. ............ | 358/402 |
| 2010/0088419 A1* | 4/2010 | Phelps et al. ................. | 709/228 |
| 2010/0253962 A1* | 10/2010 | Higuchi et al. .............. | 358/1.13 |
| 2011/0109936 A1* | 5/2011 | Coffee ............... H04N 1/00214 358/1.15 |

FOREIGN PATENT DOCUMENTS

JP     2001-197280 A    7/2001

* cited by examiner

*Primary Examiner* — Gabriel Garcia
(74) *Attorney, Agent, or Firm* — Rossi, Kimms & McDowell LLP

(57) ABSTRACT

A communication apparatus that accurately measure a time period T0 required for line connection in IPFAX, and optimizes the timing with which a T.38 CNG command is sent out. An AT command that is a dial request is converted into a SIP command that is a session-establishment request, and the SIP command is sent. When there is a provisional response or a session-establishment response to the sent SIP command, a T0 timer which clocks the time period T0 is caused to start counting.

12 Claims, 6 Drawing Sheets

SIP SESSION MANAGEMENT FOR FAX COMMUNICATION

BACKGROUND OF THE INVENTION

Field of the Invention

The present invention relates to a communication apparatus having an IPFAX function, a control method therefore, and a computer-readable storage medium storing a control program for implementing the method.

Description of the Related Art

In recent years, IPFAX capable of sending and receiving faxes using an IP network has been receiving attention. Contents for an NGN (Next Generation Network) network by NTT (Nippon Telegraph and Telephone Corporation) also include IPFAX. For call connection to IPFAX, the SIP (Session Initiation Protocol) that is a session control protocol is mainly used.

On the other hand, in the present PSTN (Public Switched Telephone Network) network, analog data is communicated using FAX modems. A typical example of FAX modems is an AT modem. The AT modem is of a type that provides modem control using the AT command set. The AT command set is a command set for modems, which was proposed by Hayes Communications Inc. in the U.S. and is the most popular at present. Commands beginning with "AT" enable overall sending and receiving functions of a modem to be easily operated from a controller.

The FAX protocol T.38 used for IPFAX is required to comply with the FAX protocol T.30 for PSTN. For this reason, FAX application resources for PSTN so far can be used substantially as they are. However, regarding call connection to IPFAX, many modifications are made because of a change to SIP. Although there is the technique to convert the AT command set into a command set complying with the T.38 protocol, no mention is made of call connection SIP (see, for example, Japanese Laid-Open Patent Publication (Kokai) No. 2001-197280).

For example, assume that an AT command issued from a FAX application is converted into a SIP command by an AT-IPFAX command conversion unit, and call connection is attempted by an IPFAX module. In an AT modem, an AT command for dialing is "ATD". For tone dial, "T" is appended to it, and for pulse dial, "P" is appended to it. At the end, a telephone number is added like "ATDT04412345678", and this command is issued to the IPFAX module. The AT-IPFAX command conversion unit in the IPFAX module converts the ATDT command into an INVITE command for requesting call connection (session establishment) using SIP. After that, a session control unit in the IPFAX module attempts INVITE connection using SIP. After receiving the ATDT command, the AT-IPFAX command conversion unit has to return a result code to the FAX application. With this result code, the FAX application determines that dialing has been completed and starts a T0 timer. When the timing with which this result code is returned to the FAX application cannot be accurately controlled, the FAX application cannot exactly know the timing with which dialing is completed, and hence measurement by the T0 timer cannot be accurate.

The T0 timer is supposed to be started after dialing is completed. Both an AT command and a SIP command may include the concept that a command ends, but they do not have the concept that dialing ends. For this reason, if the T0 timer is started with end of a command, the problem that the measurement by the T0 timer cannot be accurate will arise.

When sending of a calling tone (CNG) is requested from the FAX application after dialing is completed, the AT-IPFAX command conversion unit converts this request into a T.38 CNG command which complies with the T.38 protocol. Thereafter, a T.38 control unit in the IPFAX module sends out the T.38 CNG command to a network server or directly to an opposing machine. It is, however, useless to send out a T.38 CNG command before a SIP session is established, and hence it is necessary to control the timing of the sending as well.

SUMMARY OF THE INVENTION

The present invention provides a communication apparatus and a control method therefore that accurately measure a time period T0 required for line connection in IPFAX, and optimize the timing with which a T.38 CNG command is sent out, as well as a computer-readable storage medium storing a control program for implementing the method.

Accordingly, a first aspect of the present invention provides a communication apparatus that establishes a session using SIP to carry out a FAX communication, comprising a first conversion unit configured to convert an AT command that is a dial request into a SIP command that is a session-establishment request, a sending unit configured to send the SIP command that is the session-establishment request converted by the first conversion unit, and a control unit configured to, when there is a provisional response or a session-establishment response to the SIP command that is the session-establishment request sent by the sending unit, cause a T0 timer, which clocks a time period T0 required for line connection in the FAX communication, to start counting.

Accordingly, a second aspect of the present invention provides a control method for a communication apparatus that establishes a session using SIP to carry out a FAX communication, comprising a first conversion step of converting an AT command that is a dial request into a SIP command that is a session-establishment request, a sending step of sending the SIP command that is the session-establishment request converted in the first conversion step, and a control step of, when there is a provisional response or a session-establishment response to the SIP command that is the session-establishment request sent in the sending step, causing a T0 timer, which clocks a time period T0 required for line connection in the FAX communication, to start counting.

Accordingly, a third aspect of the present invention provides a non-transitory computer-readable storage medium storing a control program for causing a communication apparatus to implement a control method as described above.

According to the present invention, a time period T0 required for line connection in IPFAX communication can be accurately measured. Moreover, the timing with which a T.38 CNG command is sent out can be optimized.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
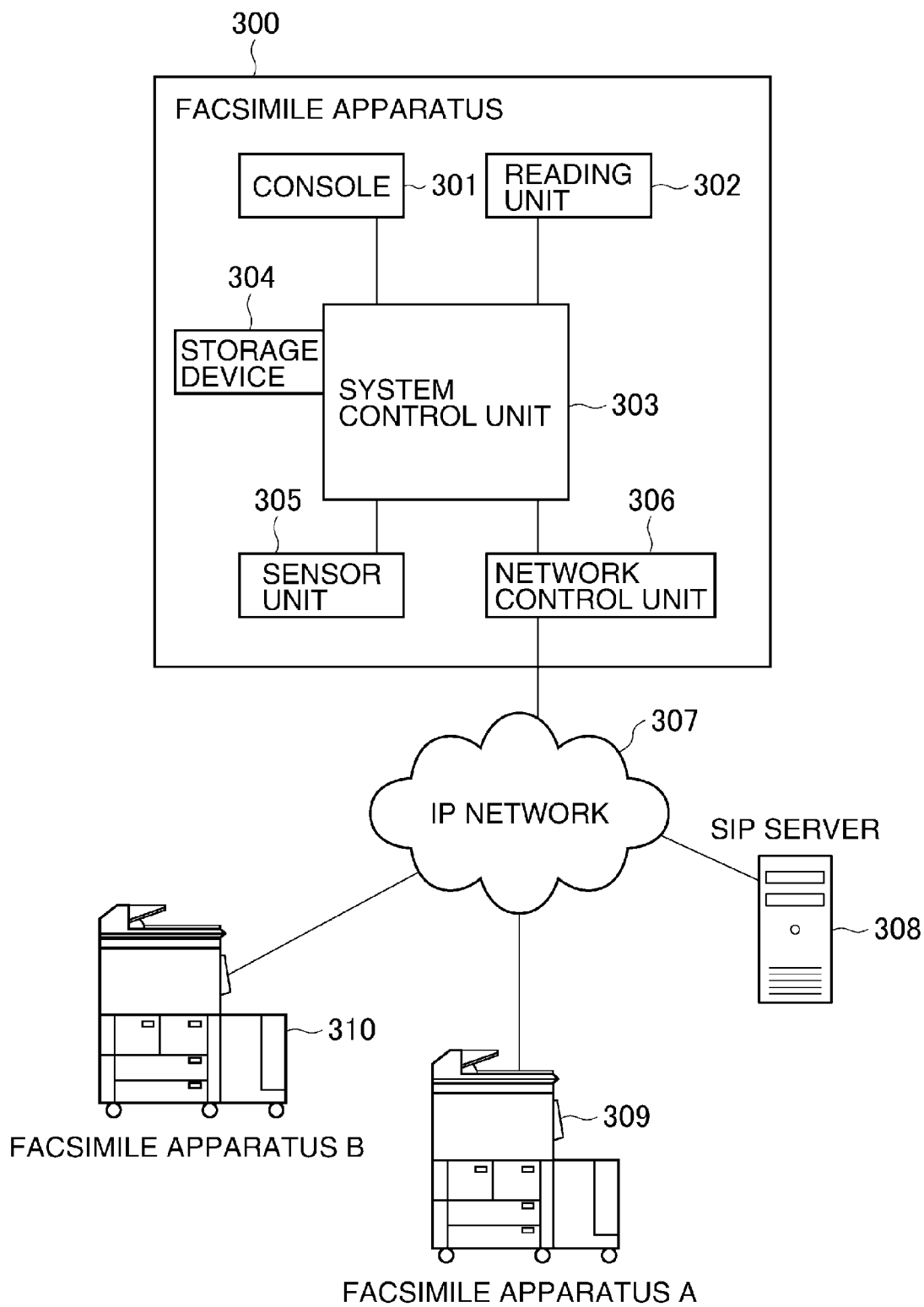
FIG. 1 is a diagram showing an exemplary communication network and an exemplary network environment thereof according to an embodiment of the present invention.

FIG. 1 is a diagram showing an exemplary communication network and an exemplary network environment thereof according to an embodiment of the present invention.

Referring to FIG. 1, a facsimile apparatus 300 is a facsimile apparatus having an IPFAX function, which is an exemplary communication apparatus according to the embodiment of the present invention. A SIP server 308 is used to relay requests and responses between facsimile apparatuses having an IPFAX function, and inquire about and register request destinations. A facsimile apparatus A 309 and a facsimile apparatus B 310 have the same arrangement as an arrangement of the facsimile apparatus 300. The facsimile apparatus 300, the SIP server 308, the facsimile apparatus A 309, and the facsimile apparatus B 310 are connected together for communication with each other via an IP network 307.

The facsimile apparatus 300 has a console 301, a reading unit 302, a system control unit 303, a storage device 304, a sensor unit 305, and a network control unit 306. The console 301 is comprised of a keyboard, a display, and so on, and an operator performs various input operations via the console 301. The reading unit 302 reads an image off an original or the like and outputs image data. The system control unit 303 controls the entire apparatus. The storage device 304 is used for primary storage of data. The sensor unit 305 is a generic name of various sensors including an original size sensor, and detection results from the sensors are transmitted to the system control unit. The network control unit 306 controls network communications.

Figure 2:
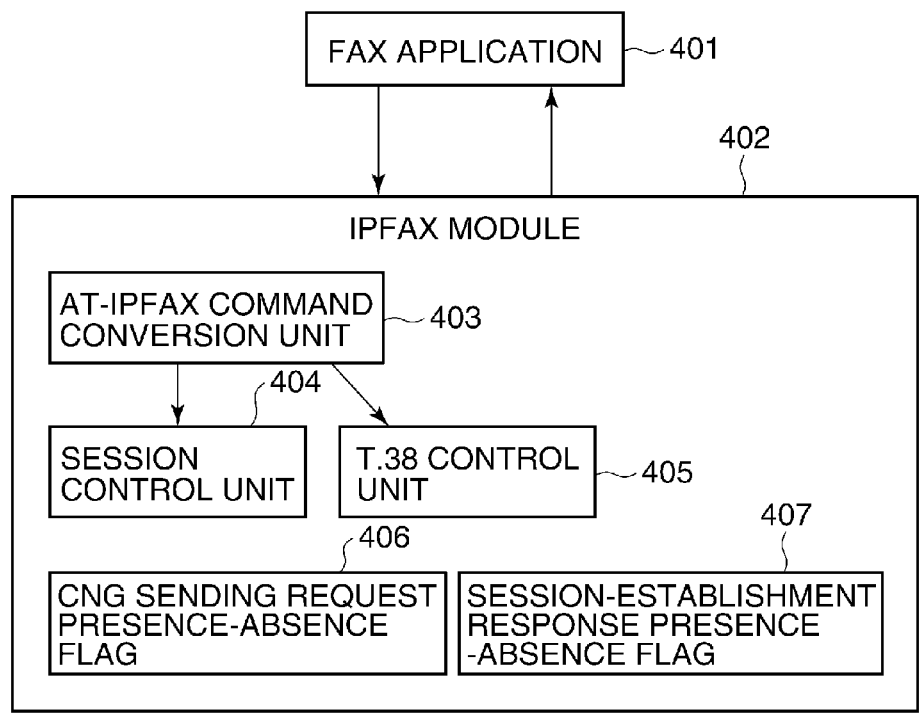
FIG. 2 is a block diagram showing an exemplary software arrangement of an IPFAX function in a facsimile apparatus appearing in FIG. 1.

FIG. 2 is a block diagram showing an exemplary software arrangement of an IPFAX function in the facsimile apparatus 300 appearing in FIG. 1. Software modules shown in the figure operate in the system control unit 303.

Referring to FIG. 2, a FAX application 401, which acts as a communication control means, is a software module for issuing and receiving AT commands, and protocol data for sending and receiving image data by FAX communication, and image data.

An IPFAX module 402 is a software module for sending and receiving image data by IPFAX, and comprised of software described hereafter. An AT-IPFAX command conversion unit 403 converts an AT command received from the FAX application 401 into a SIP command for call connection or a T.38 command for a FAX protocol. For example, a dial ATD command is converted into a session-establishment command INVITE using SIP and notifies a session control unit 404 of the same.

Also, the AT-IPFAX command conversion unit 403 converts an AT command, which is a CNG sending request from the FAX application 401, into a T.38 CNG transmission instruction (T.38 command) (second conversion unit), and notifies a T.38 control unit 405 of the same. Also, the AT-IPFAX command conversion unit 403 replaces a response using SIP with an AT command result and responds to the FAX application 401.

The session control unit 404 carries out call connection and disconnection using SIP. The T.38 control unit 405 sends and receives messages by IPFAX using the T.38 protocol. A CNG sending request presence-absence flag 406 is a software flag indicative of whether there has been a CNG sending request from the FAX application 401. A session-establishment response presence-absence flag 407 is a software flag indicative of whether or not there has been a session-establishment response in response to a session-establishment request using SIP.

Next, a description will be given of a flow of IPFAX communication in the network environment appearing in FIG. 1.

First, a description will be given of a flow of conventional IPFAX communication with reference to FIG. 6.

Figure 6:
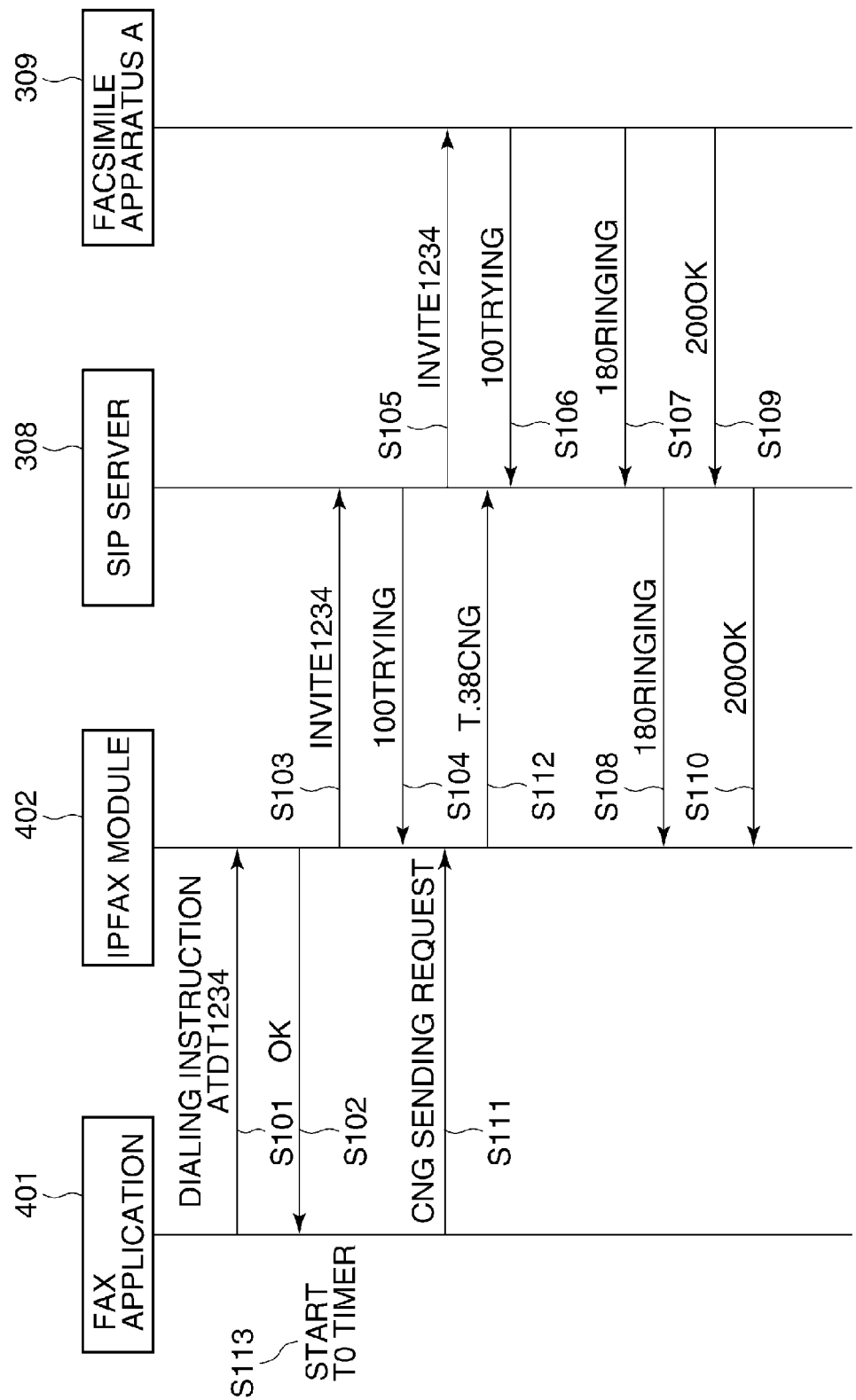
FIG. 6 is a sequence diagram showing flows of commands and flows of signals sent between the FAX application, the IPFAX module, the SIP server, and the facsimile apparatus A in conventional IPFAX communication.

FIG. 6 is a sequence diagram showing flows of commands and flows of signals sent between the FAX application 401, the IPFAX module 402, the SIP server 308, and the facsimile apparatus A 309 in conventional IPFAX communication.

First, the FAX application 401 sends a dial command to the IPFAX module 402 (S101). The IPFAX module 402 returns a result OK in response to the received dial command (S102).

Next, in response to the result OK, the FAX application 401 causes a T0 timer, which clocks a time period T0 required for line connection, to start counting (S113). Actually, no INVITE command might have been sent from the IPFAX module 402 to the SIP server 308. Also, even if an INVITE command has been sent, it may be necessary to wait for a long time due to a trouble of the SIP server 308 or a network trouble at some midpoint. Namely, this means that dialing has not been completed. Therefore, measurement by the T0 timer is incorrect.

Next, the IPFAX module 402 converts the dial command into an INVITE command which is a SIP command, and sends the INVITE command to the external SIP server 308 (S103).

The SIP server 308 returns a 100 TRYING as a provisional response to the IPFAX module 402 (S104). Then, the SIP server 308 issues an INVITE command to the facsimile apparatus A 309 that is an opposing machine (S105).

The facsimile apparatus A 309 returns a 100 Trying as a provisional response to the SIP server 308 (S106). Then, the facsimile apparatus A 309 sends a provisional response 180 Ringing to the SIP server 308 (S107).

In response to the 180 Ringing, the SIP server 308 sends a 180 Ringing to the IPFAX module 402 (S108).

When called, the facsimile apparatus A 309 sends a session-establishment response 200 OK to the SIP server 308 (S109). In response to the 200 OK, the SIP server 308 sends a 200 OK to the IPFAX module 402 (S110).

In response to the OK which is the result of the dial command, the FAX application 401 sends out a CNG sending request to the IPFAX module 402 (S111). The IPFAX module 402 causes the AT-IPFAX command conversion unit 403 to convert the CNG sending request into a T.38 CNG and sends the T.38 CNG to the SIP server 308 (S112). However, because no session is established between the facsimile apparatus 300 and the facsimile apparatus A 309, the T.38 CNG is unsuccessful.

Figure 3:
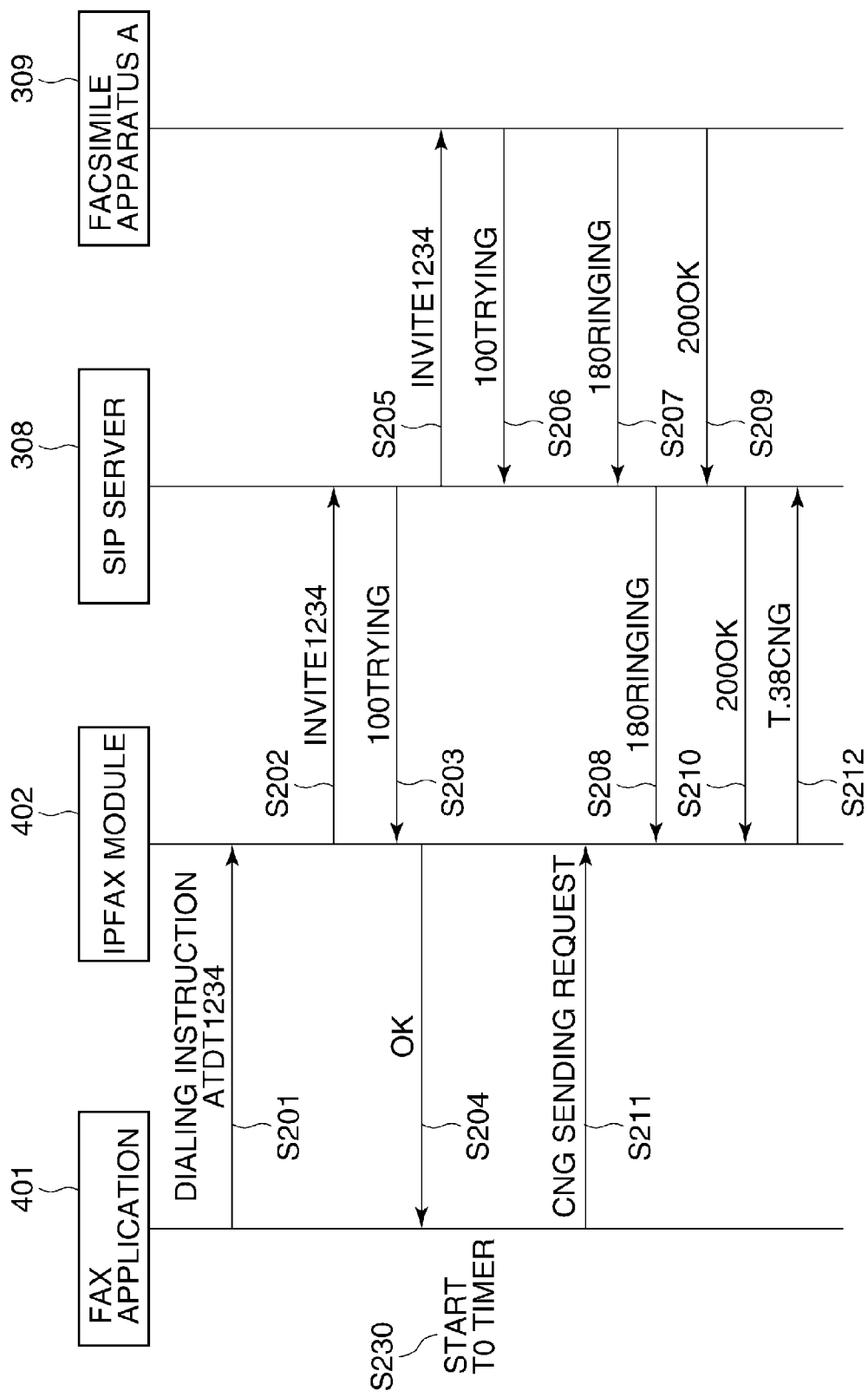
FIG. 3 is a sequence diagram showing flows of commands and flows of signals sent between a FAX application, an IPFAX module, a SIP server, and a facsimile apparatus A according to the embodiment of the present invention.

FIG. 3 is a sequence diagram showing flows of commands and flows of signals sent between the FAX application 401, the IPFAX module 402, the SIP server 308, and the facsimile apparatus A 309 according to the embodiment of the present invention.

First, the FAX application 401 sends a dial command as a dial request to the IPFAX module 402 (S201). The IPFAX module 402 converts the received dial command into an INVITE command which is a SIP command, and sends the INVITE command to the SIP server 308 (S202).

The SIP server 308 returns a 100 TRYING as a provisional response to the IPFAX module 402 (S203). With this provisional response, the IPFAX module 402 returns a result OK in response to the dial command (S204).

Next, in response to the result OK, the FAX application 401 causes the T0 timer to start counting (S230). In the present embodiment, there may be a case where a provisional response 180 Ringing or a session-establishment response 200 OK may be suddenly returned without a 100 Trying. In such a case, the IPFAX module 402 returns a result OK to the FAX application 401 in response to the dial command (S204). The return of a provisional response from the SIP server 308 indicates that network-based connection with the SIP server 308 has been successfully established, and dialing has been reliably completed. Thus, starting the T0 timer here enables more accurate measurement by the T0 timer.

On the other hand, the SIP server 308 issues an INVITE command to the facsimile apparatus A 309 (S205). The facsimile apparatus A 309 returns a 100 Trying as a provisional response to the SIP server 308 (S206). Then, the facsimile apparatus A 309 sends a provisional response 180 Ringing to the SIP server 308 (S207).

In response to the 180 Ringing, the SIP server 308 transmits a 180 Ringing to the IPFAX module 402 (S208).

When called, the facsimile apparatus A 309 sends a session-establishment response 200 OK to the SIP server 308 (S209). In response to the 200 OK, the SIP server 308 sends a 200 OK to the IPFAX module 402 (S210). With the session-establishment response 200 OK, a SIP session is established for the first time between the facsimile apparatus 300 and the facsimile apparatus A 309. In response to the 200 OK, the IPFAX module 402 sets the session-establishment response presence-absence flag 407 to True.

In response to the OK which is the result of the dial command, the FAX application 401 sends a CNG sending request to the IPFAX module 402 (S211). The IPFAX module 402 sets the CNG sending request presence-absence flag 406 to True.

Next, when both the CNG sending request presence-absence flag 406 and the session-establishment response presence-absence flag 407 are True, the IPFAX module 402 sends a T.38 CNG to the SIP server 308 (S212). In this case, because the session has been established between the facsimile apparatus 300 and the facsimile apparatus A 309, the T. 38 CNG is successful.

Figure 4:
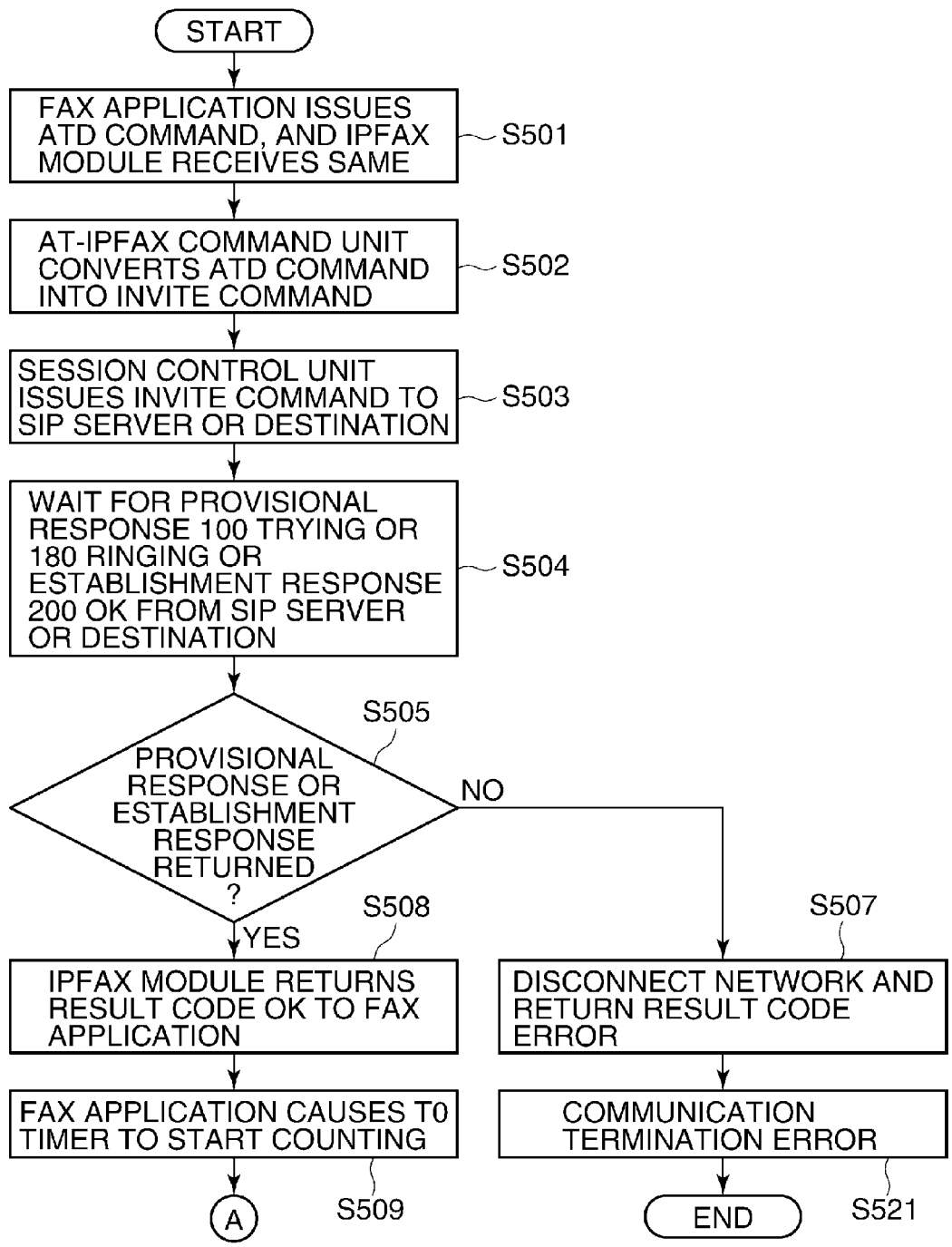
FIG. 4 is a flowchart (first) showing a flow of operations for IPFAX communication in the facsimile apparatus.
Figure 5:
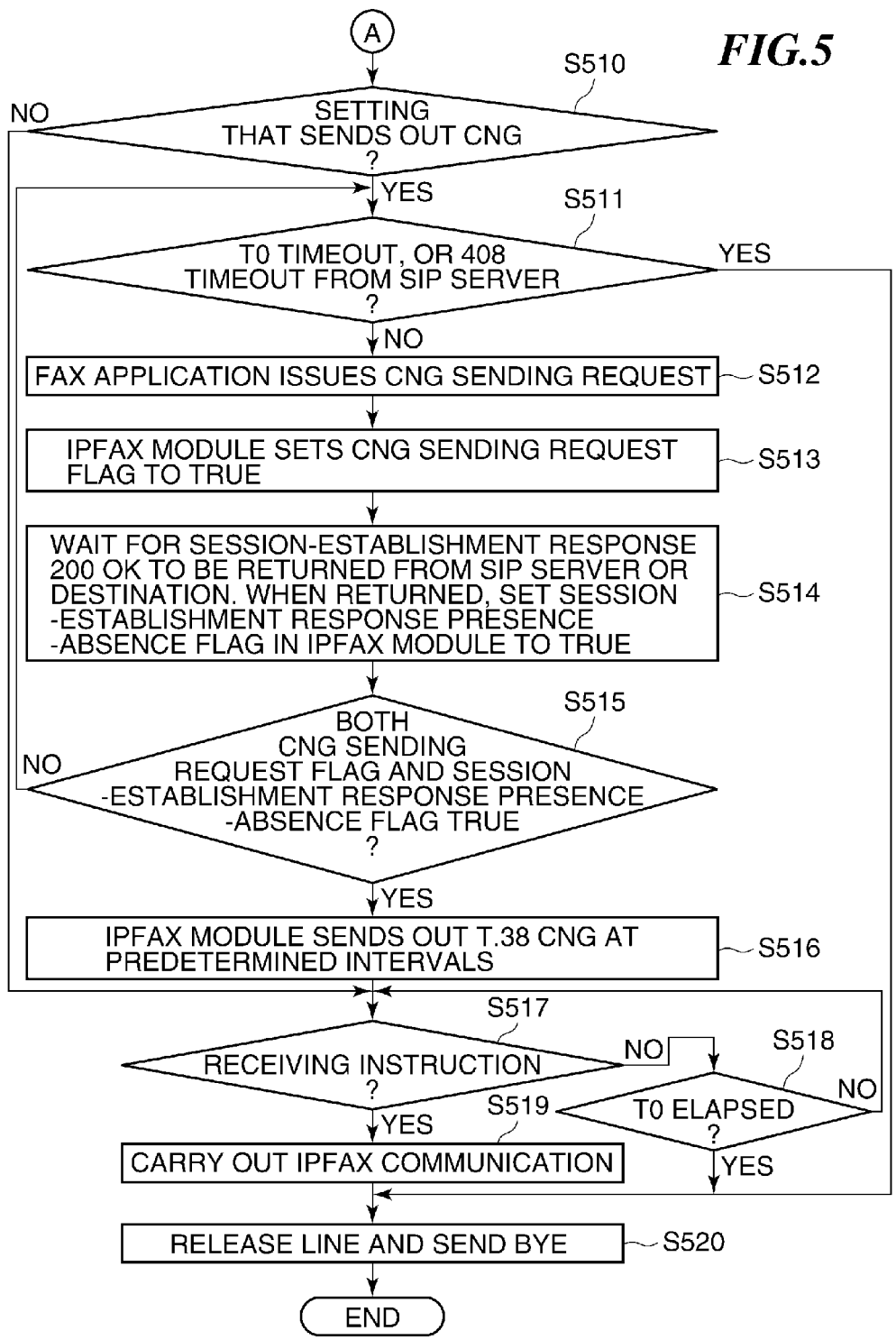
FIG. 5 is a flowchart (second) showing a flow of operations for IPFAX communication in the facsimile apparatus.

FIGS. 4 and 5 are flowcharts showing a flow of IPFAX communication in the facsimile apparatus 300.

Referring to FIG. 4, the FAX application 401 issues an ATD command as a dial command, and the IPFAX module 402 receives the ATD command (step S501). Next, the AT-IPFAX command conversion unit 403 converts the ATD command into an INVITE command using SIP (step S502). The AT-IPFAX command conversion unit 403 acts as a first conversion unit.

Then, the session control unit 404 issues the INVITE command to the SIP server 308 or directly to the facsimile apparatus A 309 which is a destination (step S503). The session control unit 404 acts as a transmission unit.

Subsequently, the IPFAX module 402 waits for a provisional response such as a 100 Trying or 180 Ringing or a session-establishment response 200 OK to be returned from the SIP server 308 or the facsimile apparatus A 309 (step S504). This corresponds to the steps S203, S208, and S210 in FIG. 3. The IPFAX module 402 acts as a control unit.

When a provisional response or a session-establishment response is returned (YES in the step S505), the IPFAX module 402 receives this response and returns a result code OK in response to the ATD command from the FAX application 401 (step S508). On the other hand, when no provisional response or session-establishment response is returned (NO in the step S505), the IPFAX module 402 disconnects the network and returns a result code ERROR (step S507). Then, it is determined that a communication error has occurred, and communication is brought to an end (step S521). This may occur in cases where, for example, the facsimile apparatus 300 could not network-connect even to the SIP server 308.

On the other hand, when a result code OK is returned in step S508, this means that the facsimile apparatus 300 can network-connect to the SIP server 308 or the facsimile apparatus A 309, and some response using SIP has been returned. Accordingly, the FAX application 401 starts the T0 timer (step S509).

Referring to FIG. 5, in step S510, the FAX application 401 determines whether or not a setting that sends out a CNG is made. Sending a CNG is an option, and when it is determined that a setting that sends out a CNG is not made (NO in the step S510), the FAX application 401 does not issue a CNG sending request and waits for a receiving instruction (step S517).

On the other hand, when it is determined that a setting that sends out a CNG is made (YES in the step S510), the FAX application 401 determines whether or not time-out of the T0 timer has occurred, and whether or not a 408 time-out response has been returned from the SIP server 308 (step S511). When time-out of the T0 timer has occurred or a 408 timeout response has been returned from the SIP server 308 (YES in the step S511), it is supposed that some network trouble has occurred, and hence the FAX application 401 releases the line and sends a BYE (step S520). When not, the process proceeds to step S512.

In the step S512, the FAX application 401 issues a CNG sending request. The step S512 corresponds to the step S211 in FIG. 3. Then, the IPFAX module 402 sets the CNG sending request presence-absence flag 406 to True (step S513). The IPFAX module 402 acts as a second holding unit.

The IPFAX module 402 waits for a session-establishment response 200 OK to be returned from the SIP server 308 or directly from the facsimile apparatus A 309 (step S514). As in the step S210 in FIG. 3, when a session-establishment response 200 OK is returned from the SIP server 308 or directly from the facsimile apparatus A 309, the IPFAX module 402 sets the internal session-establishment presence-absence flag 407 to True (step S514). The IPFAX module 402 acts as a first holding unit.

Then, the IPFAX module 402 determines whether or not both the CNG sending request presence-absence flag 406 and the session-establishment presence-absence flag 407 are True (step S515). The IPFAX module 402 acts as a control unit. When the result of determination by the IPFAX module 402 is NO in the step S515, the process returns to the step S511. On the other hand, when the result of determination by the IPFAX module 402 is YES in the step S515, the IPFAX module 402 converts an AT command which is a CNG sending request from the FAX application 401 into a T.38 CNG sending instruction, and sends out a T.38 CNG to the SIP server 308 (step S516). This T.38 CNG is sent at predetermined intervals (three seconds) as defined by T.30.

Then, the FAX application 401 determines whether or not it has received a receiving instruction (step S517), and when the FAX application 401 determines that it has received a receiving instruction, it starts IPFAX communication (step S519). On the other hand, when the FAX application 401 determines that it has not received a receiving instruction, it checks the count of the T0 timer (step S518). When the time period T0 has elapsed, the FAX application 401 instructs the IPFAX module 402 to release the line, and a BYE command using SIP is sent out (step S520).

According to the embodiment described above, an AT command which is a dialing request is converted into a SIP command which is a session-establishment request, and the SIP command is sent to the SIP server or directly to another communication apparatus. When there is a provisional response or a session-establishment response from the SIP server or another communication apparatus in response to the sent SIP command which is the session-establishment request, the T0 timer which clocks the time period T0 required for line connection in FAX communication is caused to start counting. As a result, the time period T0 required for line connection in IPFAX communication can be accurately measured.

Moreover, because a CNG which is a T.38 command is sent out when both the held session-establishment response presence-absence flag 407 and CNG sending request presence-absence flag 406 are True, the timing with which a T.38 CNG command is sent out can be optimized.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-140673 filed Jun. 24, 2011, which is hereby incorporated by reference herein in its entirety.

What is claimed is:

1. A communication apparatus comprising:
a conversion unit configured to convert a command that is a dial request into a SIP command that is a session-establishment request for establishing a SIP session to carry out a FAX communication;
a sending unit configured to send the SIP command that is the session-establishment request converted by said conversion unit;
a reception unit configured to receive a session-establishment response to the SIP command that is the session-establishment request sent by said sending unit,
a second conversion unit configured to convert an AT command that is a CNG sending request into a CNG that is a T.38 command;
a control unit configured to, when there is the session-establishment response, sending the CNG that is the T.38 command and converted by said second conversion unit; and
a releasing unit configured to release the SIP session, after it has been established, in response to a measured time passing a predetermined time period.

2. A communication apparatus according to claim 1, further comprising:
a first holding unit configured to hold a session-establishment response presence-absence flag indicative of whether or not there has been the session-establishment response to the session-establishment request sent by said sending unit;
a second holding unit configured to hold a CNG sending request presence-absence flag indicative of whether or not there has been a CNG sending request,
wherein, based on the session-establishment response presence-absence flag held by said first holding unit and the CNG sending request presence-absence flag held by said second holding unit, said control unit starts sending the CNG that is the T.38 command and converted by said second conversion unit.

3. A communication apparatus according to claim 1, wherein said sending unit is configured to send, to a SIP server, the SIP command that is the session-establishment request.

4. A communication apparatus according to claim 1, further comprising:
an establishment unit configured to establish a SIP session in accordance with the reception of the session-establishment response,
wherein the reception unit receives a provisional response to the SIP command that is the session-establishment request sent by said sending unit, the provisional response being received before the reception of the session-establishment response, and
wherein the control unit starts, in accordance with reception of the provisional response, measuring time for releasing the SIP session which has been established by the establishment unit.

5. A communication apparatus according to claim 4, further comprising a communication control unit configured to issue the command that is the dial request and cause a timer to count,
wherein said conversion unit is configured to convert the command that is the dial request issued by said communication control unit into the SIP command that is the session-establishment request, and
wherein said control unit is configured to notify said communication control unit that the provisional response has been received, thereby causing said communication control unit to start measuring time via the timer.

6. A communication apparatus according to claim 5, wherein, when the session-establishment response has not been received, said control unit is configured to notify said communication control unit of an error.

7. A communication apparatus according to claim 4:
wherein, in a case where the reception unit does not receive the provisional response, the control unit starts, in accordance with reception of the session-establishment response, measuring time for releasing the SIP session.

8. A communication apparatus according to claim 4, wherein the control unit releases the SIP session in accordance with the lapse of a predetermined time period without a predetermined signal having been received.

9. A communication apparatus according to claim 8, wherein the control unit starts the FAX communication in accordance with reception of the predetermined signal before the lapse of the predetermined time period.

10. A communication apparatus according to claim 1, wherein the control unit sends, at predetermined intervals, the CNG that is the T.38 command and converted by said second conversion unit.

11. A control method for a communication apparatus, the method comprising:

a conversion step of converting a command that is a dial request into a SIP command that is a session-establishment request for establishing a SIP session to carry out a FAX communication;

a sending step of sending the SIP command that is the session-establishment request converted in said conversion step;

a receiving step of receiving a session-establishment response to the SIP command that is the session-establishment request sent in said sending step, a second conversion step of converting an AT command that is a CNG sending request into a CNG that is a T.38 command;

a control step of starting, in accordance with reception of the session-establishment response, sending the CNG that is the T.38 command and converted in said second conversion step; and a releasing step of releasing the SIP session, after it has been established, in response to a measured time passing a predetermined time period.

12. A non-transitory computer-readable storage medium storing a computer-executable control program for controlling a communication apparatus, the program comprising:

conversion instructions configured to convert a command that is a dial request into a SIP command that is a session-establishment request for establishing a SIP session to carry out a FAX communication;

sending instructions configured to send the SIP command that is the session-establishment request converted according to said conversion instructions;

receiving instructions configured to receive a session-establishment response to the SIP command that is the session-establishment request sent according to said sending instructions, second conversion instructions configured to convert an AT command that is a CNG sending request into a CNG that is a T.38 command;

control instructions configured to, start, in accordance with reception of the session-establishment response, sending the CNG that is the T.38 command and converted according to said second converting instructions; and releasing instructions configured to release the SIP session, after it has been established, in response to a measured time passing a predetermined time period.

\* \* \* \* \*